(12) United States Patent
Awasthi

(10) Patent No.: US 6,957,267 B2
(45) Date of Patent: Oct. 18, 2005

(54) DATA PACKET PROCESSING

(75) Inventor: Vinay K. Awasthi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 971 days.

(21) Appl. No.: 09/753,083

(22) Filed: Dec. 28, 2000

(65) Prior Publication Data

US 2002/0087712 A1 Jul. 4, 2002

(51) Int. Cl.[7] .................. G06F 15/16; G06F 15/173
(52) U.S. Cl. .................. 709/232; 709/224; 709/246
(58) Field of Search ................. 709/223, 229, 709/230, 232, 234, 235, 236, 246, 247, 224; 710/29, 39, 52; 370/230, 392, 395.42; 380/255

(56) References Cited

U.S. PATENT DOCUMENTS

| 5,974,465 A | 10/1999 | Wong .................. 709/234 |
| 6,003,089 A | 12/1999 | Shaffer et al. ............ 70/233 |
| 6,101,193 A | 8/2000 | Ohba .................. 370/429 |
| 6,151,321 A * | 11/2000 | Benson et al. ......... 370/395.42 |
| 6,275,588 B1 * | 8/2001 | Videcrantz et al. ......... 380/255 |
| 6,650,640 B1 * | 11/2003 | Muller et al. ............ 370/392 |

* cited by examiner

*Primary Examiner*—Paul H. Kang
(74) *Attorney, Agent, or Firm*—Fish & Richardson P.C.

(57) ABSTRACT

Processing data packets includes comparing an actual arrival rate of data packets to a first threshold value, comparing the number of data packets stored in a queue to a second threshold value, and transmitting the data packets in the queue if the actual arrival rate is at least as great as the first threshold and the number of data packets in the queue is at least as great as the second threshold value.

31 Claims, 3 Drawing Sheets

DATA PACKET PROCESSING

BACKGROUND

The invention relates to data packet processing.

Data throughput is measured by the amount of data that is transferred from one network point to another network point in a certain period of time. The hardware and software components of many computer networks, such as Ethernet local area networks (LANs), are designed to transfer a certain optimal data packet size to maximize bandwidth usage. However, data traffic on the Internet is characterized by the exchange of short data packets which are typically shorter than the optimal size. The result is that data packet throughput on an Ethernet computer network is significantly reduced when connected to the Internet.

DETAILED DESCRIPTION

Figure 1:
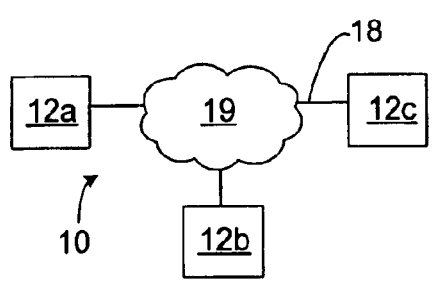
FIG. 1 illustrates a computer network system.

As shown in FIG. 1, multiple network devices 12a, 12c are interconnected over a computer network 19 through network links 18. The computer network 19 allows the exchange of information between the network devices 12a, 12c.

The physical topology of the network 19 is the actual physical arrangement of the network. For example, in a bus topology, the network devices 12a, 12c are interconnected to each other in a daisy chain fashion. In a star topology, each network device 12a, 12c is connected to a central network device such as a hub or concentrator. In a ring topology, the network devices 12a, 12c are interconnected to each other through the use of a special network device called a multiple access unit (MAU).

On the other hand, the logical topology of a computer network can be implemented using such technologies as Ethernet, Fast Ethernet, Gigabit-Ethernet, or Token Ring.

The network link 18 is the physical connection through which the actual data flows to and from each network device 12a, 12c. In one embodiment, the network link 18 can include coaxial cable, unshielded twisted pair (UTP), or optical connections. A network device 12a, 12c can serve as both the source and destination of the data to be exchanged over the computer network 19. A network device 12a, 12c may be implemented as a Transmission Control Protocol/Internet Protocol (TCIP) layer-2 device such as a switch. It also can be implemented as a layer-3 device such as a router. Exemplary network devices 12 include network printers, client workstations, network servers, and personal computers (PCs). The selection of a particular logical and physical topology of a computer network 19 depends on a myriad of factors including cost, speed, traffic conditions, and the purpose of the network.

Figure 2:
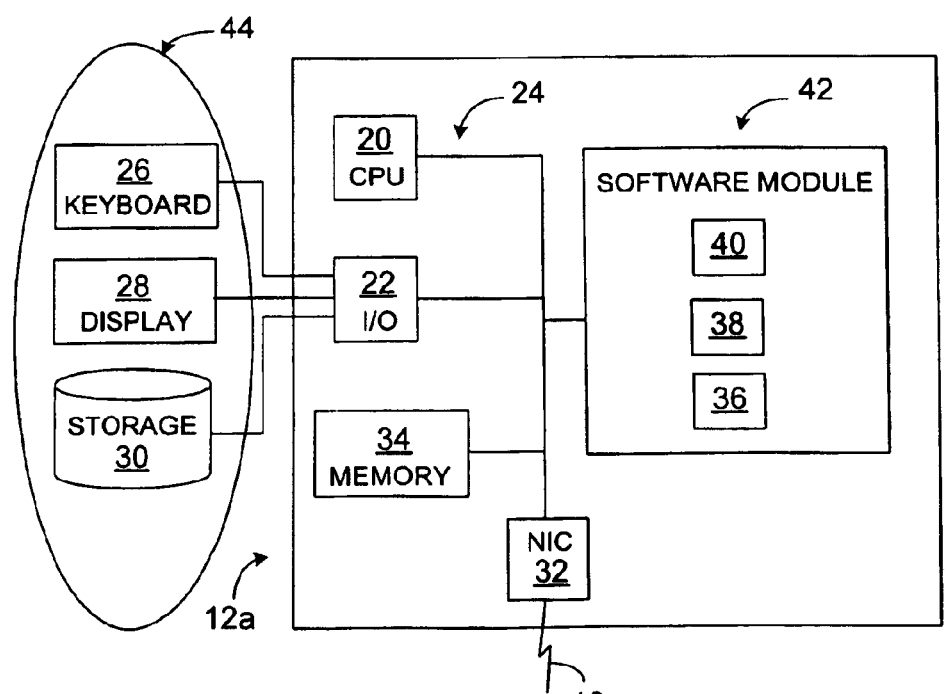
FIG. 2 illustrates a network device.

As shown in FIG. 2, a network device 12a can include a central processing unit (CPU) 20, such as an Intel Pentium™, connected to a device bus 24, such as a peripheral connect interface (PCI). The CPU 20 provides the network device 12a with the capability of executing programs stored in software module 42. The CPU 20 processes data and executes instructions residing in memory 34 such as a dynamic random access memory (DRAM). A network interface card (NIC) 32, such as an Ethernet NIC, provides the network device 12 with access to the network link 18. The network device 12 also may contain an input/output (I/O) interface 22 connected to the device bus 24. The I/O interface 22 allows peripheral devices 44 to be connected to the network device 12a. Peripherals 44 may include, for example, an input keyboard terminal 26, an output video display 28, and a mass storage device 30 such as a hard disk or a tape drive.

The network device 12a is driven and controlled by various levels of programs contained in software module 42. This includes, for example, an operating system 40 responsible for managing the network device, application programs 38 responsible for providing the necessary functions performed by the network device 12a, and device drivers 36 responsible for controlling each of the various peripherals 44. The operating system 40 can be client or server-based. Exemplary operating systems include Novel Netware™, Sun Solaris™, UnixWare™ and Windows NT™. Application programs 38, such as web-browsers or electronic-mail (Email) programs, are responsible for providing the user with a high-level interface to the network device 12a. A device driver 36 includes a program that enables the network device 12 to interface to peripherals 44. It also can provide an interface to the network interface 32 by facilitating the exchange of information over the network link 18.

In the following discussion, references to the device driver 36 specifically refer to a device driver for the network interface 32. A device driver 36 for the network interface 32 may be hardware dependent. Alternatively, it can be hardware independent using a device driver software standard interface such as the Network Driver Interface Specification (NDIS).

An application program 38 running on a network device 12a transmits a stream of information to another network device, such as network device 12b, over the computer network 19 by making a request to the device driver 36. The device driver 36 then un-bundles the request and manages the actual task of transmitting the stream of information from the network device 12a to the network link 18. The application program 38 divides the stream of information into separate data packets and makes a separate request to the device driver 36 to transmit data packets of a certain size.

Figure 3:
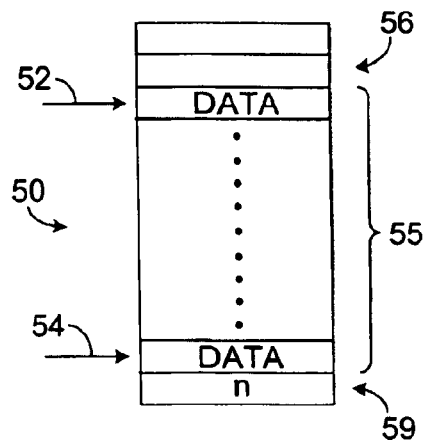
FIG. 3 is a block diagram of a queue data structure.

As shown in FIG. 3, a data queue 50 is used by the network device 12a for processing data packets. The device driver 36 manages the transmission of data packets using the queue 50.

The data queue 50 is a data structure that temporarily stores data packets in an individual queue entry 56 until the driver 36 is ready to process the data packets. The structure of the queue 50 can be, for example, a first-in-first-out (FIFO), such that the first data packet stored in the queue 50 is the first data packet removed. The data queue 50 includes a write pointer 54 responsible for maintaining the position of the last data packet that was stored on the queue. It also includes a read pointer 52 responsible for maintaining the position of the last data packet that was removed from the queue.

The data queue 50 also maintains a queue threshold 55 to indicate when the number of stored data packets has reached a predetermined level and when queue processing can commence. For example, if the queue threshold 55 were set to 80%, then queue processing would proceed only when the number of stored and un-processed data packets reached the 80% threshold level. The number of unprocessed data packets is the number of data packets between the write pointer 54 and the read pointer 52. Processing the queue includes reading the contents of the queue and then transferring the contents to the intended destination. The use of a queue threshold 55 enables the device 12a to take advantage of the available bandwidth by maintaining a high data packet throughput.

Another feature of the queue 50 is the queue size 59, represented by the symbol "n", which is a parameter that sets the maximum number of data packet entries that can be stored in the queue. It can be set to different values depending on the hardware and software requirements of the particular computer network architecture and network traffic.

The data queue 50 has a transmit size parameter (N) that represents the number of data packets that are to be transmitted during one processing period. For example, if the total number of data packets to be transmitted is one-thousand and the transmit size (N) is set to ten, then one-hundred data packets would be transmitted at each of ten times during the processing period. A processing period is the time during which a single data packet arrives for processing.

Figure 4:
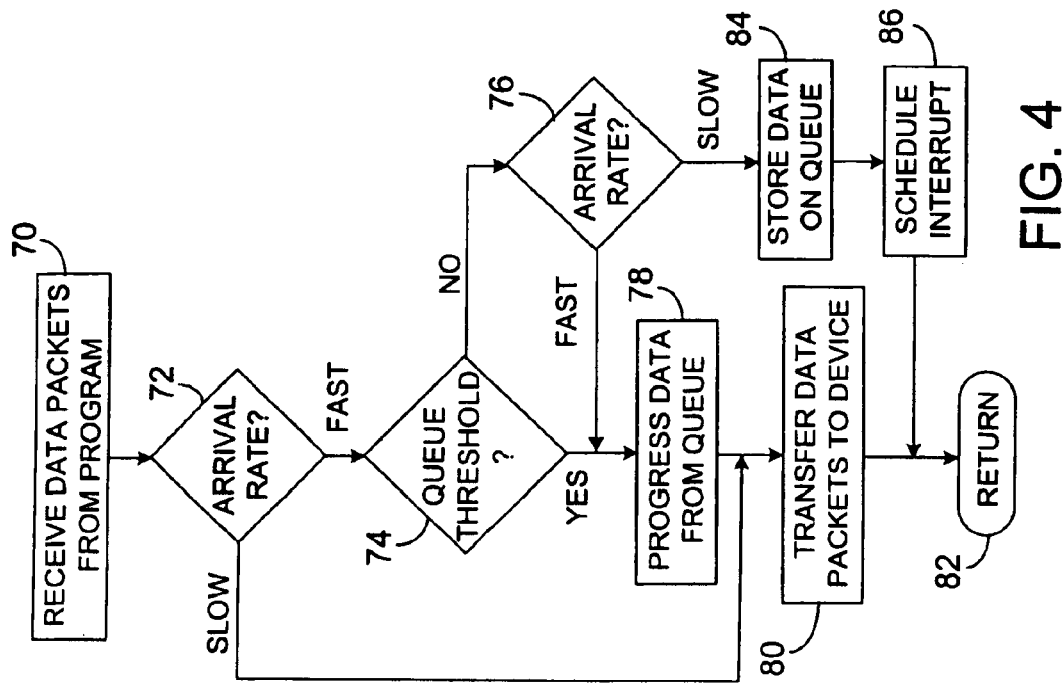
FIG. 4 is a flow chart of a method for processing data packets from an application to the device driver.

As shown in FIG. 4, the algorithm begins processing data packets when they are transferred 70 from the application program 38 to the device driver 36. The arrival rate (R) at which the application program 38 has made previous data packet transfer requests is determined 72. The arrival rate (R) can be calculated using one of several methods. In one embodiment, the time interval between successive data transfer requests is stored in a data structure that is maintained by the device driver 36. The weighted average of past data requests, for example the last six requests, can be used in the calculation.

The calculated arrival rate (R) is compared 72 to an arrival rate threshold (T). The value of the arrival rate threshold (T) is set to a number that is based on hardware and software considerations. If the calculated rate (R) is found to be lower than the predetermined threshold (T), then processing continues at block 80. In one embodiment, the next data packet in the queue 50 is transferred 80 to the network interface 32, which assumes responsibility for the actual transmission of the data packet. Once the data packet is transmitted, the process terminates and returns 82 control to the application program 38. Since the algorithm uses an arrival rate technique, it is able to detect a slow data traffic pattern and prevent the data packets from being unnecessarily placed on the queue 50.

On the other hand, if (at block 72) the arrival rate (R) is found be higher then the arrival rate threshold (T), the data packet is not immediately transmitted. Instead, the number of data packets stored on the queue that have not been processed is compared 74 to the queue threshold 55. If the queue threshold 55 has been met, then the queue is processed 78. The read pointer 52 is used to read out the next data packet that needs to be processed. Next, the read pointer 52 is advanced until all the data packets have been transmitted 80 by the network interface 32. The number of data packets transmitted in each transmission burst will vary depending on the transmit size parameter. For example, if the transmit size parameter is set to two-hundred data packets and if one-thousand data packets are ready to be processed, then a total of five data transmission bursts of two-hundred packets each are processed. In one embodiment, the network interface 32 is responsible for the actual transmission function. Once all the data packets have been transmitted, the process returns 82 control to the application program 38. The use of the transmit size technique can increase data throughput by transmitting a larger size data packet instead of several smaller packets. This can result in a more efficient use of data throughput and transmission bandwidth.

If (at block 74) the output queue threshold 55 has not been satisfied, then the processing continues with block 76 where an additional determination and comparison is made of the arrival rate (R). The determination and comparison is similar to the process at block 72. If the arrival rate (R) has increased relative to the previous arrival rate calculation, then the queue is processed according to the procedure discussed at blocks 78 and 80. That is, data packets are processed and transmitted according to the transmit size parameter (N). As the data packets are transmitted, the read pointer 52 is updated to reflect the status of the queue 50 after processing the data packets.

On the other hand, if (at block 76) the calculated arrival rate (R) is found to be lower than the arrival rate threshold (T), the data packet is stored 84 on the next available output queue entry 56 based on the write queue pointer 54. Once the data packet is stored, the write queue pointer 54 is advanced to point to the next available queue entry 56 and a future software interrupt event is scheduled 86. The process now completes and returns 82 control to the application program 38.

If no data packets subsequently arrive, then the interrupt event is generated causing the queue to be processed according to the steps previously discussed and illustrated in FIG. 4. This interrupt feature handles scenarios in which the data queue 50 has data packets ready for processing, but no subsequent data transfer requests arrive within a specified time. If this were to occur, the data packets would indefinitely remain in the queue, leading to a reduction in data throughput. By preventing the queue from becoming stale, this dynamic processing technique is able to sustain a high data throughput.

Figure 5:
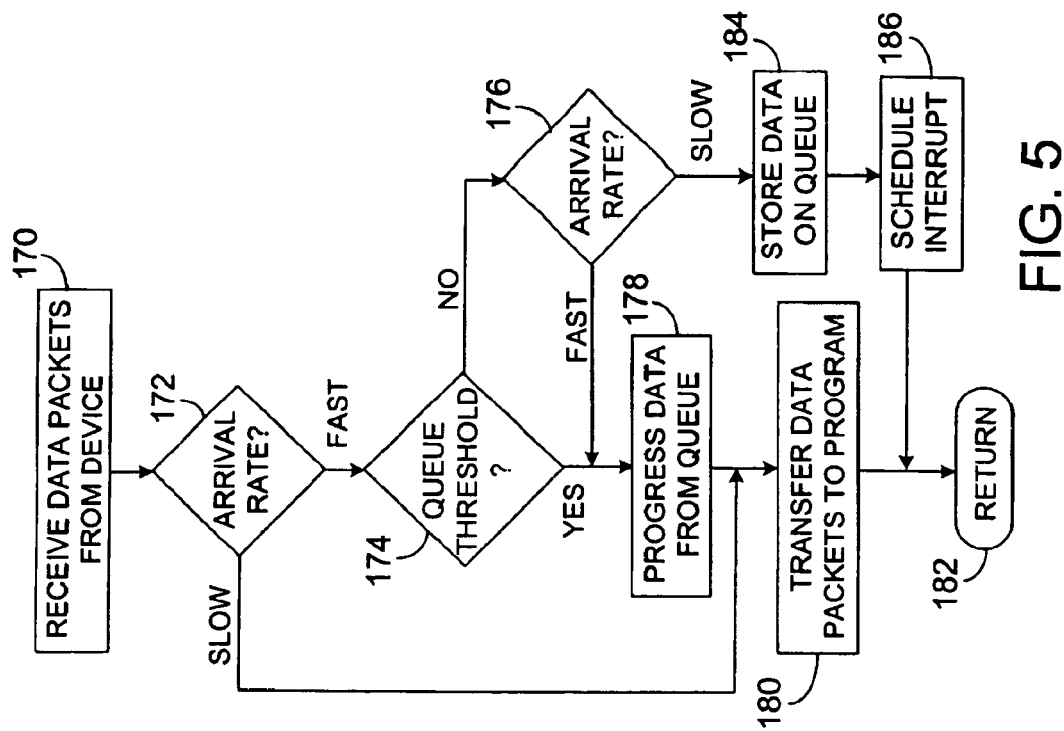
FIG. 5 is a flow chart of a method for processing data packets from a device driver to an application.

The flow chart illustrated in FIG. 5 can be used to describe the technique used in processing data packets received by the network device 12 from the computer network 19. This aspect is similar to the process used to transmit data packets from the network device 12 to the computer network 19, as discussed previously. A queue similar to data queue 50 (FIG. 3) can be used to manage these input data packets independently of the queue used to handle output data packets. The characteristics of this data queue such as queue size, queue threshold 55, and transmit size (N) can be set independently. Although the two queues operate independently of each other, their parameters can be set to the same values.

Data packets are received by the network interface 32 of the network device 12. In one embodiment, the incoming data packets cause the network interface 32 to generate a hardware level interrupt signal. The interrupt signal causes the transfer of control from whatever processing the network device 12 was currently executing to the beginning of the receiving process at 170. Once the beginning of the receiving process has control, the data packets can begin to be processed.

The arrival rate (R) can be calculated using a similar technique to the one used in the output process discussed previously. Then, the input arrival rate (R) is compared 172 to an input arrival rate threshold (T). If the arrival rate (R) is below the rate threshold (T), then the input data packet is transferred 180 directly to the application program 38. Then, the process returns 182 and transfers control to the program that was executing before the interrupt was generated.

If the arrival rate (R) is above the input arrival rate threshold (T), then the number of data packets stored on the input queue is compared 174 to an input queue threshold. If the queue threshold has been met, then the contents of the input queue are processed 178. The methods used to process the input queue can be similar to the methods used to process the output queue discussed previously. The input data packets then are transferred 180 to the application program. Once the transfer is complete, the process returns 182 control to the device driver.

If the input queue threshold has not been met, then the arrival rate is calculated and compared 176 to the threshold (T). If the arrival rate (R) is above the threshold, then the contents of the queue 50 are processed 178 and transferred 180. If the arrival rate (R) is below the arrival threshold (T), then the input data packet is stored 184 in the queue 50. A software interrupt is scheduled 186 to take place at a future time in the event no later data packets arrive from the network device 12. The process then terminates and returns 182 control to the device driver. If no later input data packets subsequently arrive, within a specified time, the interrupt is executed causing the data packet and the input queue to be processed.

Figure 6:
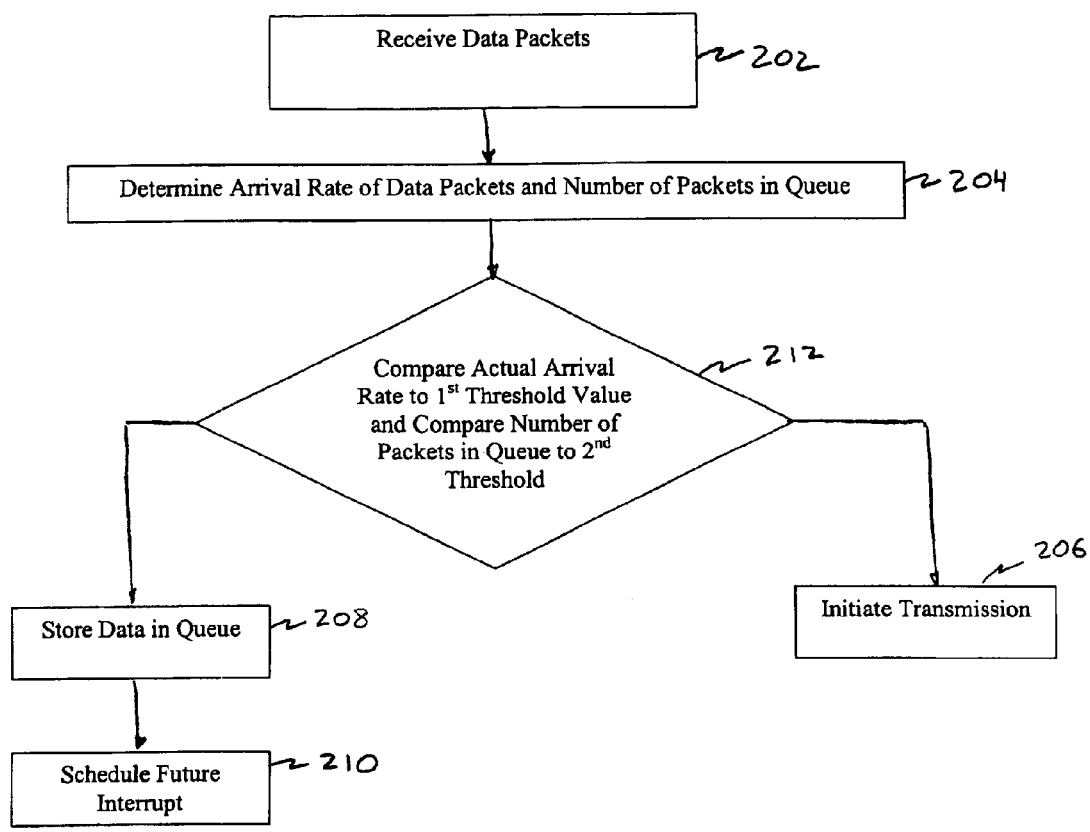
FIG. 6 is a flow chart of a method of processing data.

Referring now to FIG. 6, a method of processing data packets includes receiving 202 data packets either from a program or a device. The method also includes determining 204 an actual arrival rate of data packets and a number of data packets stored in a queue. The actual arrival rate may be determined 204 based on a weighted average of time intervals between a predetermined number of previous data packets. As illustrated, the method also includes initiating transmission 206 of one or more bursts of data packets in the queue based on the actual arrival rate and the number of data packets in the queue. The one or more bursts of data packets each contain a number of data packets sufficient to maximize throughput.

The illustrated method includes comparing 212 the actual arrival rate value. If the actual arrival rate is less than a first threshold value, the data packets are stored 208 in the queue and a future interrupt event for processing data packets from the queue is scheduled 210. If the actual arrival rate is greater than the first threshold value, the data packets are transmitted 206 without being stored in the queue. Transmission of data packets may be to either a device or a program. The first threshold value corresponds to a predetermined arrival rate. The method also includes comparing 212 the number of data packets in the queue to a second threshold value. The second threshold value represents a number of unprocessed data packets.

The foregoing techniques can enable output data packets to be processed and transferred by the device driver 36 and transmitted efficiently across the network interface 32. The improvements to data throughput apply to the processing of input data packets as well as to output data packets. The two processing paths can be independent of each other so that they can better respond to different traffic conditions.

The forgoing techniques can achieve a substantial increase in data packet throughput by implementing a dynamic data packet queue that is responsive to traffic conditions on a computer network connected to the Internet or other network.

Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

Other implementations are within the scope of the following claims.

What is claimed is:

1. A method of processing data packets comprising:
   determining an actual arrival rate of data packets and a number of data packets stored in a queue; and
   initiating transmission of at least one burst of data packets in the queue based on the actual arrival rate and the number of data packets in the queue;
   wherein a minimum number of data packets in the at least one burst depends on a transmit size parameter.

2. The method of claim 1 including receiving the data packets from a program; and transmitting the data packets to a device.

3. The method of claim 1 including receiving the data packets from a device; and transmitting the data packets to a program.

4. The method of claim 1 wherein the at least one burst contains a number of data packets sufficient to maximize throughput.

5. The method of claim 1 further including storing a data packet in the queue if the actual arrival rate is less than a first threshold value, and scheduling a future interrupt event to cause processing of data packets from the queue.

6. The method of claim 1 further including comparing the actual arrival rate of data packets to a first threshold.

7. The method of claim 6 further including transmitting a data packet without storing the data packet in the queue, if the actual arrival rate is greater than the first threshold value.

8. The method of claim 6 wherein the actual arrival rate is based on a weighted average of time intervals between a predetermined number of previous data packets and the first threshold value corresponds to a predetermined arrival rate.

9. The method of claim 1 further including comparing the number of data packets to a second threshold.

10. The method of claim 9 wherein the second threshold value represents a number of unprocessed data packets.

11. The method of claim 1 wherein the minimum number of data packets in the at least one burst is equal to a maximum number of packets that the transmit size parameter is set to accommodate.

12. An article comprising a computer-readable medium that stores computer-executable instructions for causing a computer system to:
    determine an actual arrival rate of data packets and a number of data packets stored in a queue; and
    initiate transmission of at least one burst of data packets in the queue based on the actual arrival rate and the number of data packets in the queue;
    wherein a minimum number of data packets in the at least one burst depends on a transmit size parameter.

13. The article of claim 12 including receiving the data packets from a program; and transmitting the data packets to a device.

14. The article of claim 12 including receiving the data packets from a device; and transmitting the data packets to a program.

15. The article of claim 12 wherein the at least one burst contains a number of data packets sufficient to maximize throughput.

16. The article of claim 12 further including instructions to store a data packet in the queue if the actual arrival rate is less than the first threshold value, and scheduling a future interrupt event to cause processing of data packets from the queue.

17. The article of claim 12 further including instructions to compare the actual arrival rate of data packets to a first threshold, wherein the actual arrival rate is based on a weighted average of time intervals between a predetermined number of previous data packets, and wherein the first threshold value corresponds to a predetermined arrival rate.

18. The article of claim 17 further including instructions to transmit a data packet without storing the data packet in the queue, if the actual arrival rate is greater than the first threshold value.

19. The article of claim 12 further including instructions to compare the number of data packets to a second threshold, wherein the second threshold value represents a number of unprocessed data packets.

20. A data packet processing device comprising:

a source of data packets;

a destination of data packets; and a data packet processing engine, configured to determine an actual arrival rate of data packets and a number of data packets stored in a queue and initiate transmission of at least one burst of data packets in the queue based on the actual arrival rate and the number of data packets in the queue;

wherein a minimum number of data packets in the at least one burst depends on a transmit size parameter.

21. The device of claim 20 wherein the at least one burst of data packets; contains a number of data packets sufficient to maximize throughput.

22. The device of claim 20 further including storing a data packet in the queue if the actual arrival rate is less than the first threshold value, and scheduling a future interrupt event to cause processing of data packets from the queue.

23. The device of claim 20 further including comparing the actual arrival rate of data packets to a first threshold, wherein the actual arrival rate is based on a weighted average of time intervals between a predetermined number of previous data packets, and wherein the first threshold value corresponds to a predetermined arrival rate.

24. The device of claim 23 further including transmitting a data packet without storing the data packet in the queue, if the actual arrival rate is greater than the first threshold value.

25. The device of claim 20 further including comparing the number of data packets to a second threshold, wherein the second threshold value represents a number of unprocessed data packets.

26. A computer network system comprising:

an input device for receiving data packets from the network;

an output device for transmitting data packets to the network;

wherein each device includes a data packet processing engine configured to determine an actual arrival rate of data packets and a number of data packets stored in a queue and initiate transmission of at least one burst of data packets in the queue based on the actual arrival rate and the number of data packets in the queue; and wherein a minimum number of data packets in the at least one burst depends on a transmit size parameter.

27. The system of claim 26 wherein the at least one burst of data packets, contains a plurality of data packets sufficient to maximize throughput.

28. The system of claim 26 further including storing a data packet in the queue if the actual arrival rate is less than the first threshold value, and scheduling a future interrupt event, wherein the occurrence of the future interrupt event causes processing of data packets from the queue.

29. The system of claim 26 further including comparing the actual arrival rate of data packets to a first threshold, wherein the actual arrival rate is based on a weighted average of time intervals between a predetermined number of previous data packets, and wherein the first threshold value corresponds to a predetermined arrival rate.

30. The system of claim 29 further including transmitting a data packet without storing the data packet in the queue, if the actual arrival rate is greater than the first threshold value.

31. The system of claim 26 further including comparing the number of data packets to a second threshold, wherein the second threshold value represents a number of unprocessed data packets.

* * * * *